Jan. 6, 1970   J. E. JOHNSON   3,487,691
WATERPROOF SELF-CONTAINED TEMPERATURE RECORDER
Filed Aug. 8, 1968
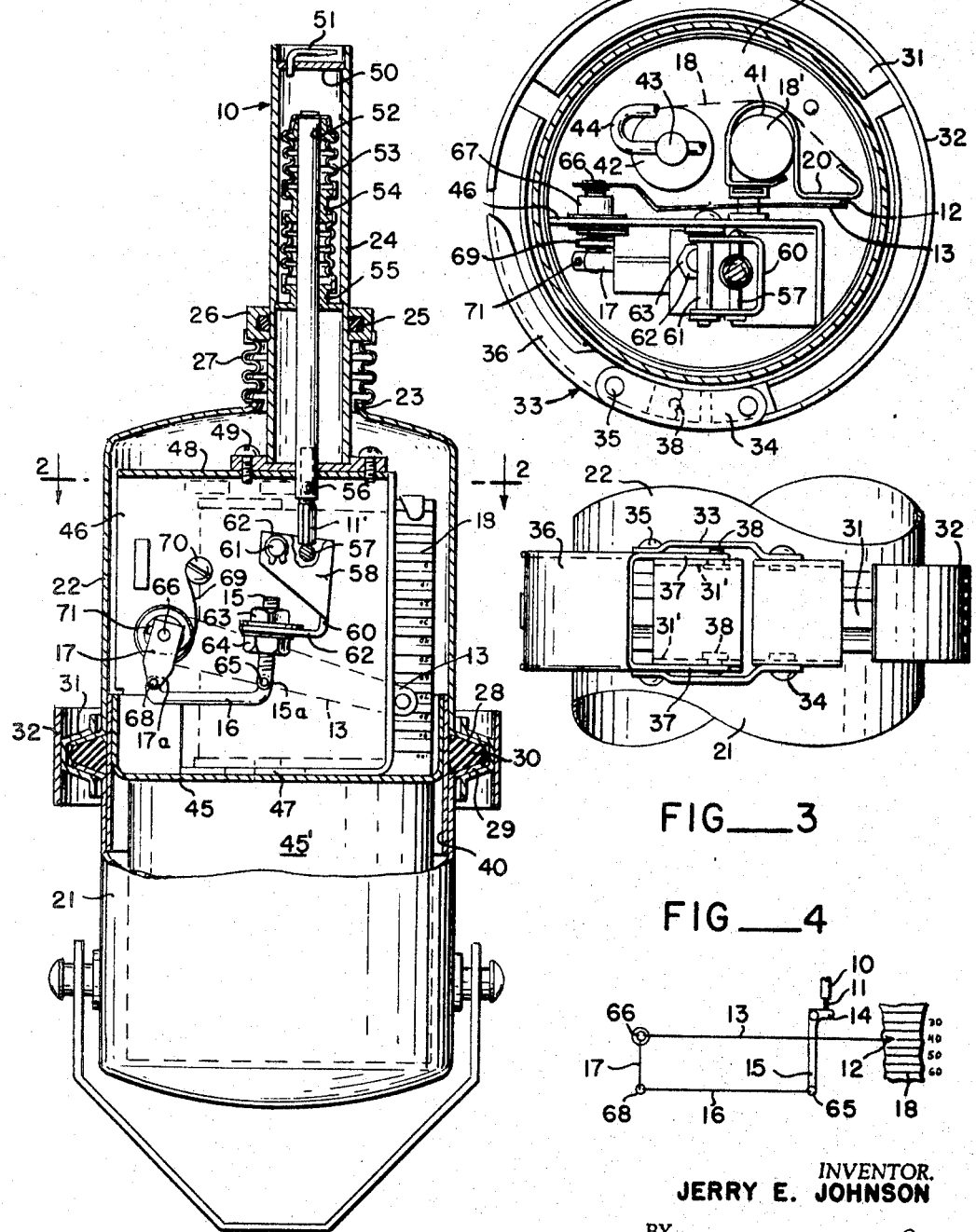
INVENTOR.
JERRY E. JOHNSON
BY
*ATTORNEYS*

United States Patent Office 3,487,691
Patented Jan. 6, 1970

3,487,691
WATERPROOF SELF-CONTAINED TEMPERATURE RECORDER
Jerry E. Johnson, Bellevue, Wash., assignor to Ryan Instruments, Inc., Seattle, Wash., a corporation of Delaware
Filed Aug. 8, 1968, Ser. No. 751,223
Int. Cl. G01k 1/02, 5/70
U.S. Cl. 73—343.5      9 Claims

ABSTRACT OF THE DISCLOSURE

The recorder is a completely self-contained temperature recording instrument utilizing an expansible liquid filled sensing probe. Changes in liquid volume results in a change in deflection in a metal bellows which in turn causes a connected push rod to move linearly. The linear displacement of the push rod is applied to a lever pin assembly to move and rotate a recording pen. A torsional load spring is attached to the pen lever arm to apply a force back through the lever pin linkage thus keeping the lever pin loaded against the push rod. This spring force aids the metal bellows during its extension resulting from contraction of the liquid on lowering temperatures.

---

This invention relates to improvements in portable sealed recording thermometers of the type used in mobile compartments to prove an accurate and continuous in transit record of the temperature at which the compartment is maintained and of the submersible type used in hydrographical operations.

The invention aims to provide such a thermometer with improved sensitivity utilizing a probe as the thermostatic element and which is accurate, compact, durable, and easy to minutely adjust, set and seal, and also is of relatively simple and economical construction.

Other and more particular objects and advantages of the invention will, with the foregoing, appear and be understood in the course of the following description and claims, the invention consisting in the novel construction and in the adaptation and combination of parts hereinafter described and claimed.

In the accompanying drawing:

FIG. 1 is an elevational view, partly in vertical section, of a recording thermometer embodying the present invention;

FIG. 2 is a transverse sectional view taken along the line 2—2 of FIG. 1;

FIG. 3 is a fragmentary elevational view showing the clamping mechanism for the case; and FIG. 4 is a schematic of the stylus and probe with their interconnecting linkage.

Referring to FIG. 4 it is seen that basically the mechanism of the present invention comprises a thermostatic probe 10 having a linear output to a push rod 11 whose movement is multipled and translated into swing of a stylus 12 on arm 13 by operation of a bell crank 14-15, link 16 and a lever 17 which is fixed relative to the stylus arm 13. The stylus 12 continuously marks a chart 18 travelling over a platen 20. The rod 11 and the crank arm 15 are adjustable in length to adjust the zero setting and the range of the stylus.

The mechanism is housed in a case 21 having a cover 22 with an off-center top opening through which the probe projects. Provision is made to maintain a seal between the rim 23 of this top opening and the tubular housing 24 of the probe. This is accomplished by an O-ring 25 held in a retainer ring 26 which is in turn joined to the rim 23 by an accordian 27 giving generous tolerance in alinement of the probe relative to the cover 22.

As seen in FIG. 1, the case and cover are formed with outwardly extending opposed circumferential flanges 28–29 at their open ends which converge to squeeze an O-ring seal 30 therebetween. Sealing pressure against these flanges 28–29 is maintained by a quick-release clamping mechanism comprising three arcuate V-band sections 31 joined by an outer strap 32 and tensioned over the flanges by an over-center toggle latch 33. This latch has a link 33 pivoted at 34 to one of the sections 31 and at 35 to the latch handle 36. An extension of the handle presents a fork head 37 which reacts against alined pins 38 projecting from the adjoining section 31'. Inward movement of the O-ring 30 is limited by an inner sleeve extension 40 of the case 21 which has a slide interfit with the cover 22.

Returning to the actual mechanism, a roll 18' of the chart stock is stored in a well 41, and after feeding over the platen 20 it doubles back behind the platen and well to a take-up spool 42. The spindle 43 of this spool has a key handle 44 at the top and extends downwardly through the base of a mounting cup 45 seated in the sleeve 40 to a clockwork mechanism 45' depending into the case 21. This clockwork functions to wind the chart 18 at a given rate correlated with a time scale on the chart.

The stylus and related linkage are mounted on a central support wall 46 having a bottom flange 47 secured in the cup 45 and an upper flange 48 into which the base of the probe housing 24 is mounted as by screws 49. At its free end the probe housing is closed by a plug 50 having a fill tube 51 therethrough for introduction of a suitable high expansible type liquid such as alcohol after which the tube is pinched closed. This liquid acts on a bellows assembly secured by a cap 52 to the top of the rod 11 and comprising one or more bellows 53 sleeved on the rod. For purposes of example a pair of bellows are shown connected together by an intermediate sleeve 54 slidable relative to the rod 11. The lower end of the bottom bellows is anchored to an inner plug 55 which is fixed to the probe housing 24 and like the intermediate sleeve 54 is slidable relative to the rod 11.

At its lower end the rod 11 extends through the flange 48 and is internally threaded to adjustably receive an extension 11' which has a hexagonal head for accepting a wrench. Adjusted effective length of the rod via its extension is secured by a set screw 56 or by using a locking type compound on the threads. The head of the extension 11' seats against a cross-pin 57 bridging a pair of cheeks 58 which are cross-connected by a web 60 and are pivoted on a stub shaft 61. This shaft projects from the wall 46 and receives a gripping ring 62. At its lower end the web 60 angles as a flange 62 into parallel relation with the axes of the cross-pin 57 and stub shaft 61.

Relating the schematic of FIG. 4, the U-shaped member providing the cheeks 58, web 60, and web flange 62 comprises the crank 14. The extension 15 of the longer arm of this crank is provided by an externally-threaded adjusting pin formed with a clevis 15a at its lower end which pivotally receives the related end of the link 16 at 65. This pin 15 extends through an opening in the web flange 62 and is alined such that its longitudinal axis intersects that of the stub shaft 61. A pair of nuts 63–64 fix the pin 15 relative to the crank 14 and permit adjustment of the effective length of the pin and hence of the longer arm of the crank 14–15 as viewed in the schematic.

The stylus arm 13 and the lever 17 are fixed on a rocker shaft 66 passing through the wall 46 and journaled in a bearing 67 mounted on the stylus side of the wall. A set screw 71 permits adjustment of the lever 17 relative to the stylus arm. At its lower end the lever 17 has a clevis 17a pivotally connected at 68 to the related end of the link 16 and at its upper end is biased by a torsion spring 69 which is anchored to the wall 46 by a screw 70. The spring 69 biases the lever 17 in the counterclockwise direction as viewed in FIG. 1, and hence keeps the cross-pin 57 in contact with the push rod 11.

The longer arm of the crank 14–15, and namely the distance from the stub shaft 61 to the pivot pin 65 for the link 16, is purposely made considerably longer than the effective length of the lever 17 so that angular deflection of the crank 14–15, responsive to linear movement of the rod 11 caused by expansion or contraction of the bellows 53 with temperature changes of the expansible liquid in the probe, will be multiplied at the stylus 12. This ratio of the length of the longer crank arm to the lever length can be varied by adjusting the nuts 63–64 to vary the distance from the flange 62 to the pivot pin 65. Hence, when such distance is increased by backing off on nut 63 and tightening nut 64, the angular displacement of the stylus for a given temperature increment is increased accordingly.

It will be noted that in the chart 18 the abscissas represent temperature intervals and that the ordinates are arcuate in correspondence with the swing arc of the stylus 12 and represent time intervals correlated with the clockwork mechanism and diameter of the spool. Also, it will be noted that the chart is upside down in the sense that the lower temperatures are at the top of the chart and the higher temperatures are at the bottom.

Ideally, the instrument should be initially calibrated in a temperature environment corresponding to the mean temperature on the chart scale, i.e. 40° F. on the illustrated chart. In this regard, the rocker shaft 66 is purposely located in the same horizontal plane as the center abscissa on the chart scale. Accordingly, as shown in FIG. 4, the instrument linkage is first adjusted so that at the mean temperature the longer arm of the crank 14–15 and the lever 17 are vertical and the link 16 and stylus arm 13 are horizontal. For this preliminary setting the screw 56, screw extension 11' of the push rod 11, the set screw 71, and nuts 63–64 may all have to be utilized. Then the instrument is placed in a warmer or colder atmosphere corresponding to one of the temperature extremes on the chart to make a range check. If the stylus 12 does not responsively move to the proper temperature the length of the longer arm of the crank 14–15 is changed by adjusting the nuts 63–64 to adjust the stylus range. For example, if the actual temperature is 90° F. and the stylus only reads 70° F., the longer crank arm should be lengthened by backing off on nut 63 and tightening nut 64 until the stylus reaches the 90° F. abscissa. Then, when the instrument is placed back at the midscale temperature, if the stylus does not return exactly to midscale it may be necessary to turn the extension 11' very slightly until the stylus reaches midscale. To illustrate, if the stylus only returned to 40° F. the extension 11' would be turned very slightly clockwise (tightened). This stylus centering adjustment may in turn slightly affect the prior stylus range adjustment. If so, a repetition of these adjustments will normally perfectly correlate the probe, the stylus, and the chart scale.

In the described embodiment the probe 10, platen 20, chart 18, wall 46 and the thereto attached stylus operating mechanism, the cup 45 and depending clockworks 45', all comprise a unit independent of the case 21 and cover 22. When this unit is to be used it is seated in the sleeve 40 of the case 21, and after the clockworks is wound and the elastic sealing ring 30 has been positioned, the cover 22 is applied by sliding the O-ring 25 and associated accordian 27 over the probe housing 24. When the cover lip 28 is seated against the sealing ring 30 the strap 32 with its arcuate V-band sections 31 fitted over the lips 28–29 is closed and tensioned by throwing the handle 36 of the toggle latch 33 over center.

It is believed that the invention will have been clearly understood from the foregoing detailed description of my now-preferred illustrated embodiment. Changes in the details of construction may be resorted to without departing from the spirit of the invention.

The embodiments of the invention in which an exclusive property or privilege is claimed are defined as follows:

1. A recording thermometer comprising, a platen, clockwork means for advancing a recording chart lengthwise over said platen at a predetermined rate, a stylus working on said platen on an arc transverse of the chart for marking the chart as the chart advances, said chart having time indicated along its length and temperature indicated across its width, a rocker shaft, a stylus arm on said rocker shaft and carrying said stylus, a lever on said rocker shaft, a bell crank mounted to rock on an axis fixed in parallel spaced relation to that of said rocker shaft, a link pivotally connected between said lever and a first crank arm of said bell crank, a housing for the afore-mentioned components, and thermostatic probe means projecting from said housing and anchored relative to said platen, said probe means comprising a piston with expansible liquid acting thereon to move the piston endwise responsive to temperature changes in the environment surrounding the probe means, and rod means operatively interconnecting said piston with the second arm of said bell crank whereby endwise movement of the piston is translated into angular movement of the bell crank, the stylus arm being longer than said lever and the effective length of said first crank arm being longer than that of the second crank arm and also being longer than that of said lever whereby travel of the piston responsive to temperature change is greatly multiplied at the stylus.

2. A recording thermometer according to claim 1 wherein said lever and first crank arm are substantially at right angles to both the link and the stylus arm when the temperature of said environment is mid-range and the stylus is responsively at the mid-range on the chart.

3. A recording thermometer according to claim 1 in which adjusting means is provided for varying the effective length of said first crank arm to that of said lever for correlating the stylus to the temperature range of the chart.

4. A recording thermometer according to claim 1 in which adjusting means are provided for adjusting the length of said rod means to thereby center the stylus on the chart when said environment is mid-range.

5. A recording thermometer according to claim 1 in which adjusting means is provided for varying the effective length of said first crank arm to that of said lever for correlating the stylus to the temperature range of the chart, and in which adjusting means are provided for adjusting the length of said rod means to thereby center the stylus on the chart when said environment is mid-range.

6. A recording thermometer according to claim 1 in which spring means biases said crank into engagement with said rod means and said probe means includes a bellows connected to said piston.

7. A recording thermometer according to claim 1 in which said probe has a tubular case anchored relative to said table, and yieldable sealing means between said case and said housing slidably mounted on said case and fixed to said housing.

8. A recording thermometer according to claim 1 in which said bell crank presents a cross-pin opposing the free end of said rod means, and spring means biasing said cross-pin into engagement with said free end of the rod means.

9. A recording thermometer according to claim 1 in which said housing is generally cylindrical and is divided into two parts intermediate its ends, said parts presenting opposed outwardly directed annular lips which slope toward one another and confine an elastic O-ring against an internal sleeve projecting endwise of one of said parts, and toggle operated clamping means for holding said lips against said O-ring.

References Cited

UNITED STATES PATENTS 3,119,269   1/1964   Hiscock _____ 73—343.5

JOSEPH W. HARTARY, Primary Examiner

U.S. Cl. X.R.

73—368.3; 346—72